US012270910B2

(12) United States Patent
Wang et al.

(10) Patent No.: US 12,270,910 B2
(45) Date of Patent: Apr. 8, 2025

(54) SYSTEM AND METHOD OF CAPTURING THREE-DIMENSIONAL HUMAN MOTION CAPTURE WITH LIDAR

(71) Applicants: XIAMEN UNIVERSITY, Fujian (CN); SHANGHAITECH UNIVERSITY, Shanghai (CN)

(72) Inventors: Cheng Wang, Xiamen (CN); Jialian Li, Xiamen (CN); Lan Xu, Shanghai (CN); Chenglu Wen, Xiamen (CN); Jingyi Yu, Shanghai (CN)

(73) Assignees: Xiamen University, Xiamen (CN); ShanghaiTech University, Shanghai (CN)

( * ) Notice: Subject to any disclaimer, the term of this patent is extended or adjusted under 35 U.S.C. 154(b) by 325 days.

(21) Appl. No.: 17/884,273

(22) Filed: Aug. 9, 2022

(65) Prior Publication Data

US 2023/0273318 A1 Aug. 31, 2023

Related U.S. Application Data

(63) Continuation of application No. PCT/CN2022/078083, filed on Feb. 25, 2022.

(51) Int. Cl.
*G01S 17/89* (2020.01)
*G01S 17/86* (2020.01)
*G06N 20/00* (2019.01)

(52) U.S. Cl.
CPC .............. *G01S 17/89* (2013.01); *G01S 17/86* (2020.01); *G06N 20/00* (2019.01)

(58) Field of Classification Search
CPC ........ G01S 17/89; G01S 17/86; G01S 7/4808; G06N 20/00; G06N 3/0464; G06N 3/09; G06N 3/045; G06V 40/23
See application file for complete search history.

(56) References Cited

U.S. PATENT DOCUMENTS 10,937,178 B1   3/2021 Srinivasan
11,537,819 B1 * 12/2022 Das ..................... G06F 18/24
(Continued)

FOREIGN PATENT DOCUMENTS

CN   110596683 A   12/2019
CN   110873879 A    3/2020
(Continued)

OTHER PUBLICATIONS

Deng et al. (Fusing Geometrical and Visual Information via Superpoints for the Semantic Segmentation of 3D Road Scenes, 2020) (Year: 2020).*
(Continued)

*Primary Examiner* — Mohammad K Islam
(74) *Attorney, Agent, or Firm* — Sheppard Mullin Richter & Hampton LLP

(57) ABSTRACT

Described herein are systems and methods for training machine learning models to generate three-dimensional (3D) motions based on light detection and ranging (LiDAR) point clouds. In various embodiments, a computing system can encode a machine learning model representing an object in a scene. The computing system can train the machine learning model using a dataset comprising synchronous LiDAR point clouds captured by monocular LiDAR sensors and ground-truth three-dimensional motions obtained from IMU devices. The machine learning model can be configured to generate a three-dimensional motion of the object based on an input of a plurality of point cloud frames captured by a monocular LiDAR sensor.

31 Claims, 11 Drawing Sheets

(56) References Cited

U.S. PATENT DOCUMENTS

| | | | |
|---|---|---|---|
| 11,628,855 B1* | 4/2023 | Pradhan | G01S 17/58 |
| | | | 701/24 |
| 2018/0072313 A1* | 3/2018 | Stenneth | G01S 17/89 |
| 2018/0204338 A1 | 7/2018 | Narang et al. | |
| 2018/0217663 A1 | 8/2018 | Chandrasekhar et al. | |
| 2019/0163968 A1* | 5/2019 | Hua | G06V 20/58 |
| 2020/0160559 A1 | 5/2020 | Urtasun et al. | |
| 2020/0183007 A1* | 6/2020 | Nagashima | G01S 17/93 |
| 2021/0299873 A1* | 9/2021 | Badiozamani | B25J 9/1653 |
| 2022/0066459 A1* | 3/2022 | Jain | G06N 3/047 |
| 2022/0143467 A1* | 5/2022 | Green | A63B 24/0087 |
| 2022/0321343 A1* | 10/2022 | Bahrami | H04W 12/033 |

FOREIGN PATENT DOCUMENTS

| | | |
|---|---|---|
| CN | 111665512 A | 9/2020 |
| CN | 113466890 A | 10/2020 |
| CN | 112923934 A | 6/2021 |

OTHER PUBLICATIONS

David et al. (A Review on Deep Learning Techniques for 3D Sensed Data Classification, 2019) (Year: 2019).*

PCT International Search Report and the Written Opinion mailed Nov. 10, 2022, issued in related International Application No. PCT/CN2022/078083 (9 pages).

PCT International Search Report and the Written Opinion mailed Nov. 29, 2022, issued in related International Application No. PCT/CN2022/079151 (10 pages).

* cited by examiner

342

| Method | MPJPE↓ | PA-MPJPE↓ | PCK0.5↑ | PCK0.3↑ | Accel↓ | PVE↓ |
|---|---|---|---|---|---|---|
| HMR | 224.86 | 130.71 | 0.67 | 0.49 | 22.07 | 284.15 |
| VIBE | 154.61 | 108.19 | 0.82 | 0.64 | 12.49 | 191.55 |
| Ours | 79.31 | 66.72 | 0.95 | 0.86 | 4.52 | 101.64 |

344

| Method | MPJPE↓ | PA-MPJPE↓ | PCK0.5↑ | PCK0.3↑ | Accel↓ | PVE↓ |
|---|---|---|---|---|---|---|
| P++/GRU | 86.43 | 72.19 | 0.94 | 0.83 | 5.20 | 109.48 |
| ATT/ST-GCN | 96.28 | 75.21 | 0.92 | 0.81 | 4.66 | 120.42 |
| P4T/ST-GCN | 79.52 | 66.25 | 0.95 | 0.86 | 4.54 | 101.77 |
| VOT/ST-GCN | 146.20 | 100.40 | 0.83 | 0.67 | 7.10 | 185.33 |
| P++/ST-GCN(Ours) | 79.31 | 66.72 | 0.95 | 0.86 | 4.52 | 101.64 |

346

| Method | MPJPE↓ | PA-MPJPE↓ | PCK0.5↑ | PCK0.3↑ | Accel↓ | PVE↓ |
|---|---|---|---|---|---|---|
| P++ w/o ST-GCN | 85.93 | 70.61 | 0.94 | 0.84 | 4.91 | 109.27 |
| P++/ST-GCN w/o $\mathcal{L}_{J_{SMPL}}$ | 87.13 | 69.35 | 0.94 | 0.83 | 4.98 | 110.23 |
| P++/ST-GCN(Ours) | 79.31 | 66.72 | 0.95 | 0.86 | 4.52 | 101.64 |

FIGURE 3C

Computing Component 400

Hardware Processor(s) 402

Machine-Readable Storage Media 404

Encode a machine learning model representing an object in a scene
406

Train the machine learning model using a dataset comprising synchronous LiDAR point clouds captured monocular LiDAR sensors and ground-truth three-dimensional motions obtained from IMU devices
408

Generate, by the trained machine learning model, a three-dimensional motion of the object based on an input of a plurality of point cloud frames captured by a monocular LiDAR sensor
410

FIGURE 4A

Computing Component 450

Hardware Processor(s) 452

Machine-Readable Storage Media 454

Input a plurality of point cloud frames to a machine learning model, the machine learning model comprising a temporal encoder module comprising a feature learning network, a two-way GRU, and an MLP decoder
456

Extract, by the feature learning network, a global descriptor for each point cloud frame
458

Fed the global descriptor into the two-way GRU to generate a pluraltiy of hidden variables
460

Input the hidden variables to the MLP decoder to predict locations and rotations of a plurality of joints of an object
462 output, by the trained machine learning model, a three-dimensional motion of the object based on the predicted locations and rotations of the plurality of joints
464

FIGURE 4B

SYSTEM AND METHOD OF CAPTURING THREE-DIMENSIONAL HUMAN MOTION CAPTURE WITH LIDAR

CROSS REFERENCE TO RELATED APPLICATION

This application is a continuation application of International Patent Application No. PCT/CN2022/078083, filed on Feb. 25, 2022. The above-referenced application is incorporated herein by reference in its entirety.

TECHNICAL FIELD

The present inventions generally relate to capturing motion. More particularly, the present inventions relate to a system and method of capturing long-range three-dimensional human motion.

BACKGROUND

In recent years, deep neural networks have achieved impressive results in inferring three-dimensional human poses from images or video, and research focus of deep neural networks has been tightly intertwined with designing dataset with which to train deep neural networks. However, these datasets do not, generally, include human motion captured using light detection and ranging (LiDAR) sensors at long ranges or distances, ground truth human motions acquired by IMU systems, and synchronous color images. As such, there is a need for such a training dataset covering depth information and accurate three-dimensional pose ground truth information. Learning-based methods usually process point clouds by taking into account spatial-temporal relationships in point clouds along with time sequences. As an alternative to widely used marker-based solutions, marker-less motion capture technologies can alleviate the requirement having body-worn markers of the marker-based solutions.

SUMMARY

Described herein are systems and methods for training machine learning models to generate three-dimensional (3D) motions based on light detection and ranging (LiDAR) point clouds. In various embodiments, a computing system can encode a machine learning model representing an object in a scene. The computing system can train the machine learning model using a dataset comprising synchronous LiDAR point clouds captured by monocular LiDAR sensors and ground-truth three-dimensional motions obtained from IMU devices. The machine learning model can be configured to generate a three-dimensional motion of the object based on an input of a plurality of point cloud frames captured by a monocular LiDAR sensor.

In some embodiments, the object can be a human.

In some embodiments, the synchronous LiDAR point clouds can comprise a plurality of point cloud frames captured by the monocular LiDAR sensors situated at a distance away from the human, and each point of the plurality of point cloud frames can comprise a timestamp and an intensity value. The particular distance can range from at least 10 to 50 meters.

In some embodiments, the ground-truth three-dimensional motions can be associated with the human and each ground-truth three-dimensional motion of the human can comprise a timestamp, spatial coordinates and rotations of a plurality of joints of the human. The ground-truth three-dimensional motions can further comprise three-dimensional poses of the human.

In some embodiments, the dataset can further comprise synchronous images of the human.

In some embodiments, the dataset can comprise labels for the synchronous images of the human. Each label can comprise a two-dimensional enclosure enclosing the human depicted in the synchronous images.

In some embodiments, the computing system can train a second machine learning model using the synchronous images of the human in the dataset. The trained machine learning model can output a second three-dimensional motion of the human. The three-dimensional motion of the human can be evaluated based on the second three-dimensional motion of the human.

In some embodiments, wherein the machine learning model can comprise a temporal encoder module for extracting a global descriptor from each point cloud frame, generating a plurality of hidden variables for the global descriptor, and predicting a plurality of joint locations. In some embodiments, the temporal encoder module can comprise a PointNet++ network, a two-way GRU model, and an MLP decoder. The PointNet++ network can be configured to extract the global descriptor, the two way GRU model can be configured to generate the plurality of hidden variables, and the MLP decoder can be configured to predict the plurality of joint locations.

In some embodiments, the machine learning model can further comprise a kinematics solver module for learning concatenations of the global feature with each joint to generate completed joint features and outputting the completed joint features to compute the plurality of joint rotations. In some embodiments, the kinematics solver module can comprise a ST-GCN model. The ST-GCN model can be configured to learn the concatenated global features with each joint.

In some embodiments, the machine learning model can further comprise a joint optimizer module for optimizing rotations of the plurality of joint rotations. In some embodiments, the joint optimizer module can comprise a SMPL model. The SMPL model can be configured to optimize rotations of the plurality of joint rotations.

Described herein are methods for generating three-dimensional (3D) motions based on light detection and ranging (LiDAR) point clouds. In various embodiments, a plurality of point cloud frames can be inputted to a machine learning model. Each point cloud frame can comprise a plurality of points captured by a monocular LiDAR sensor. The machine learning model can comprise a temporal encoder module comprising a feature learning network, a two-way GRU, and an MLP decoder. The feature learning network can extract a global descriptor for each point cloud frame. The global descriptor can be fed into the two-way GRU to generate a plurality of hidden variables. In general, hidden variables are fusions of temporal information between two or more point cloud frames. The hidden variables can be inputted to the MLP decoder to predict locations and rotations of a plurality of joints of the object. The trained machine learning model can output a three-dimensional motion of the object based on the predicted locations and rotations of the plurality of joints.

In some embodiments, the object can be a human.

In some embodiments, the machine learning model can be trained using a dataset comprising synchronous LiDAR point clouds captured by monocular LiDAR sensors and ground-truth three-dimensional motions obtained from IMU devices.

In some embodiments, the synchronous LiDAR point clouds can comprise a plurality of point cloud frames captured by the monocular LiDAR sensors situated a particular distance away from the human. Each point of the plurality of point cloud frames can comprise a timestamp and an intensity value. The particular distance can range from at least 10 to 50 meters.

In some embodiments, the feature learning network can be a PointNet++ network.

In some embodiments, the feature learning network can be a Point 4D Transformer.

In some embodiments, the two-way GRU can comprise a hidden layer configured to output the hidden variables.

In some embodiments, the locations of the plurality of joints can be estimated by the temporal encoder by minimizing a loss formulated as:

$$\mathcal{L}_{\mathcal{J}} = \sum_{t} \left\| J_{GT}^{(t)} - \hat{J}^{(t)} \right\|_{2}^{2}$$

where $\hat{J}^{(t)}$ is a predicted joint location of the t-th frame and $J_{GT}^{(t)}$ is the ground truth joint location of the t-th frame.

In some embodiments, the machine learning model can further comprise kinematics solver module. In some embodiments, the kinematics solver can comprise an ST-GCN model. The ST-GCN model can learn concatenations of the global descriptor with each joint to generate joint features. The joint features can be outputted to compute the rotations of the plurality of joints.

In some embodiments, the machine learning model can further comprise a joint optimizer module. In some embodiments, the joint optimizer can comprise an SMPL model. The rotations of the plurality of joints can be inputted to the SMPL model to obtain optimized joint parameters from which the plurality of joint rotations are optimized.

In some embodiments, the rotations of the plurality of joints can be estimated by the temporal encoder module, the kinematic solver module, and the joint optimizer module.

These and other features of the apparatuses, systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3C illustrates a table comparing quantitative comparisons of three-dimensional human motions, according to various embodiments of the present disclosure.

FIG. 4A illustrates a computing component that includes one or more hardware processors and a machine-readable storage media storing a set of machine-readable/machine-executable instructions that, when executed, cause the hardware processor(s) to perform a method for training machine learning models to generate three-dimensional motions based on LiDAR point clouds, according to various embodiments of the present disclosure.

FIG. 4B illustrates a computing component that includes one or more hardware processors and a machine-readable storage media storing a set of machine-readable/machine-executable instructions that, when executed, cause the hardware processor(s) to perform a method for generating three-dimensional motion based on LiDAR point clouds, according to various embodiments of the present disclosure.

Figure 1:
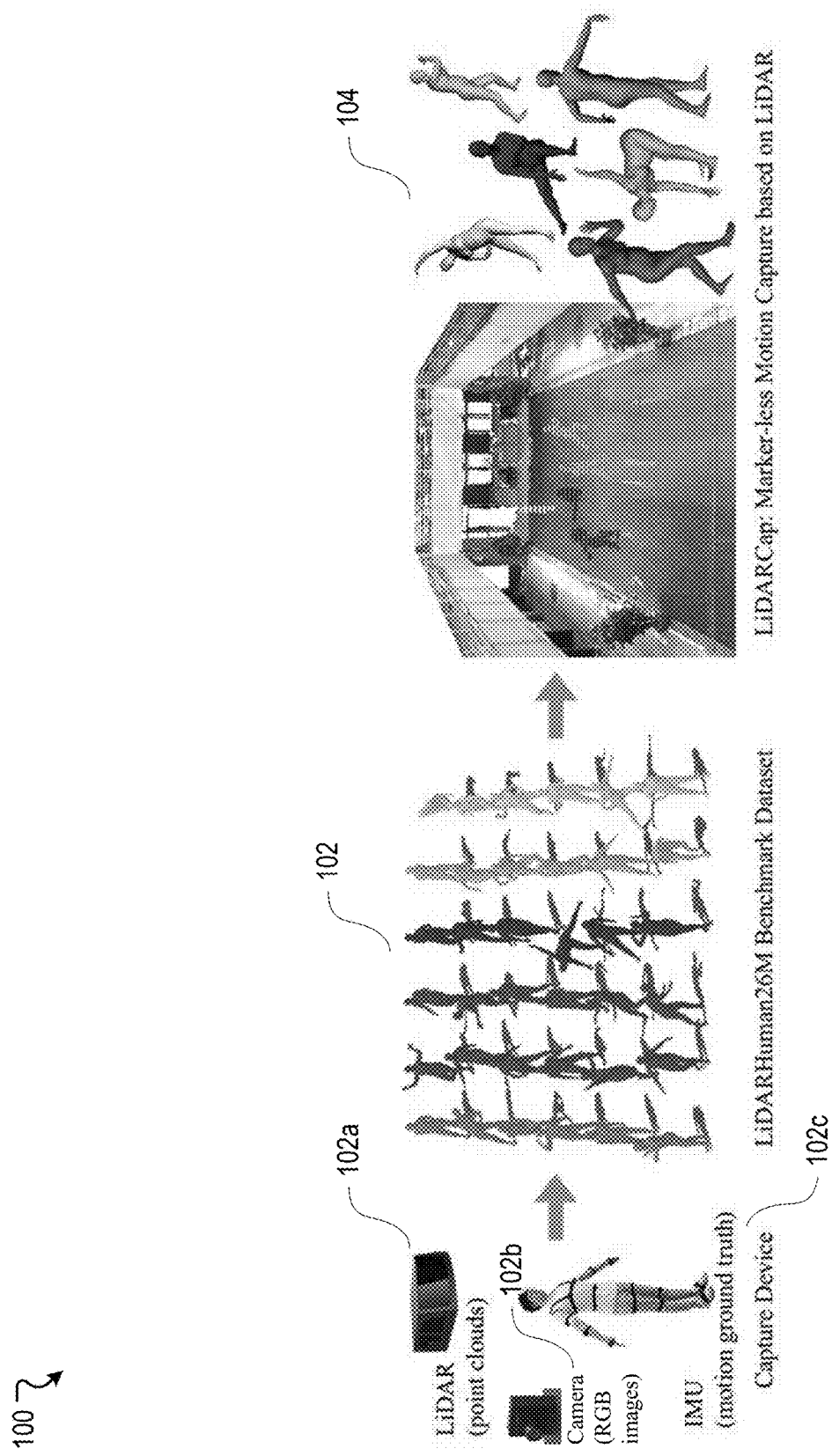
FIG. 1 illustrates an overview of a LiDARCap, according to various embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Recently, there has been a rapid development of marker-less human motion capture for applications such as virtual reality, augmented reality, and interactive entertainment. In such applications, conveniently capturing long-range three-dimensional human motions in a large space can be challenging, which is critical for live events. Under conventional methods, vision-based motion capture (mocap) solutions are used to capture three-dimensional human motions. Under conventional methods, high-end solutions using dense optical markers or dense camera rigs are used for capturing three-dimensional human motions. These solutions are infeasible, economically, for consumer-level usage. In contrast, monocular capture methods are more practical and attractive. Further, recent developments in learning-based techniques have enabled robust human motion capture from a single video stream. For example, using pre-scanned human templates or parametric human models for determine human motion from the single video stream. However, such methods, in long-range capturing scenarios where performers are far away from cameras, the captured images suffer from degraded and blurred artifacts, leading to fragile motion capture.

Various approaches have been explored to capture three-dimensional human motions under such degraded and low-resolution image capturing scenarios. But these approaches are still fragile to capture global positions under long-range settings, especially when handling texture-less clothes or environmental lighting changes. As such, to handle texture-less clothes and environmental lighting changes, motion capture using body-worn sensors such as Inertial Measurement Units (IMUs) has been widely adopted due to its independence to environmental changes. However, requiring performers to wear body-worn sensors makes this particular solution unsuitable for capturing motions of people wearing everyday apparel. Moreover, IMU-based solutions suffer from an accumulated global drifting artifact, especially in long-range settings. An alternative solution of capturing human motions using consumer-level RGBD sensors are also undesirable for long-range capture in a large scene, due to relatively short effective range of cameras (e.g., RGBD cameras), which is generally less than 5 meters.

Disclosed herein are inventions that address the problems described above. In accordance with various embodiments of the present inventions, a consumer-level light detection and ranging (LiDAR) based solution is provided to address the problems described above. The LiDAR based solution can include a LiDAR. The LiDAR sensor can provide accurate depth information of a large-scale scene with a large effective range (up to 30 m). This solution enables capturing of human motions in long-range settings under general lighting conditions, and without degraded artifacts of visual sensors in cameras, such as RGBD cameras. However, capturing long-range three-dimensional human motions using a LiDAR sensor, such as a monocular LiDAR sensor, remains challenging. First, under long-range settings, validly-observed point clouds corresponding to a target performer can be sparse and noisy, making robust motion capture difficult. Second, despite the popularity of using LiDAR sensors for three-dimensional modeling, most existing solutions focus on scene understanding and three-dimensional perception. Third, the lack of a large-scale LiDAR-based dataset with accurate three-dimensional human motion annotations renders a data-driven motion capture pipeline using LiDAR impractical.

To address these challenges, in accordance with various embodiments of the present inventions, a marker-less, long-range and data-driven motion capture method using a single LiDAR sensor, or LiDAR capture (LiDARCap), is provided, as illustrated in FIG. 1. FIG. 1 illustrates an overview 100 of the LiDARCap, according to various embodiments of the present disclosure. As shown in FIG. 1, the overview 100 of the LiDARCap can include a dataset 102 with which to train the LiDARCap. Once the LiDARCap is trained, the LiDAR-Cap can generate three-dimensional human motions of performers 104 based on a plurality of LiDAR point cloud captured from a LiDAR sensor, such as a monocular LiDAR sensor. In some embodiments, the dataset can be a LiDARHuman26M dataset. The LiDARHuman26M dataset, in various embodiments, can be a large bench-mark dataset for LiDAR-based human motion capture. The LiDARHuman26M dataset can comprise various modalities, including, for example, synchronous LiDAR point clouds 102a, visual (e.g., RGB) images 102b, and ground-truth 3D human motions 102c obtained from professional IMU-based mocap devices. In some embodiments, the LiDARHuman26M dataset can include 20 types of daily motions, 13 performers with 184.0 k capture frames, and roughly 26 million valid 3D points of observed performers with a large capture distance ranging from 12 m to 28 m. In this regard, the LiDARHuman26M dataset is the first of its kind for data-driven LiDAR-based human motion capture in long-range settings. Furthermore, in accordance with other embodiments of the present inventions, a strong baseline motion capture approach on LiDAR point clouds is provided. Moreover, in accordance with yet other embodiments of the present inventions, the LiDARCap is evaluated using state-of-the-art image-based methods as baselines. These evaluations highlight the benefit of the LiDARCap as compared with image-based method under long-range settings.

LiDARCap Approach

Marker-less 3D motion capture in long-range scenarios can be challenging under conventional methods of using cameras. For example, two-dimensional cameras provide no depth information and depth sensing cameras can only work in short ranges or distances. As such, LiDAR sensors have the advantages of having both long sensing range and an ability to obtain depth information. In accordance with various embodiments of the present inventions, a human motion dataset (e.g., the LiDARHuman26M dataset) containing LiDAR point clouds on long-range human motion scenarios can be provided together with synchronized IMU-captured motion ground truth. Furthermore, an end-to-end model that can infer an optimal parametric human model from the LiDAR point clouds can also be provided. In some cases, a Skinned Multi-Person Linear (SMPL) model can be used to represent pose and shape of a human body compactly. In some embodiments, the SMPL model can contain pose parameters $\theta \in \mathbb{R}^{72}$ that are associated with human motion. In some embodiments, the pose parameters can be formulated as rotations for 23 joints relative to their parent joints and global body rotation for a root joint. In some embodiments, the SMPL model can contain, in addition to the pose parameters or separately, shape parameters $\beta \in \mathbb{R}^{10}$, which control height, weight, and limb proportions of humans associated with the human motions. In some embodiments, the SMPL model can contain, in addition to the pose parameters and the shape parameters or separately, translation parameters $t \in \mathbb{R}^{3}$ that can be used when human positions are needed. In various embodiments, the SMPL model can deform three-dimensional meshes associated with the human motion. For example, in one particular implementation, the SMPL model can be configured to deform a template of a triangulated mesh with 6890 vertices based on pose and shape parameters of humans. In such cases, the triangulated mesh can be formulated as $V = \mathcal{M}(\theta, \beta)$.

Training Dataset

Figure 2A:
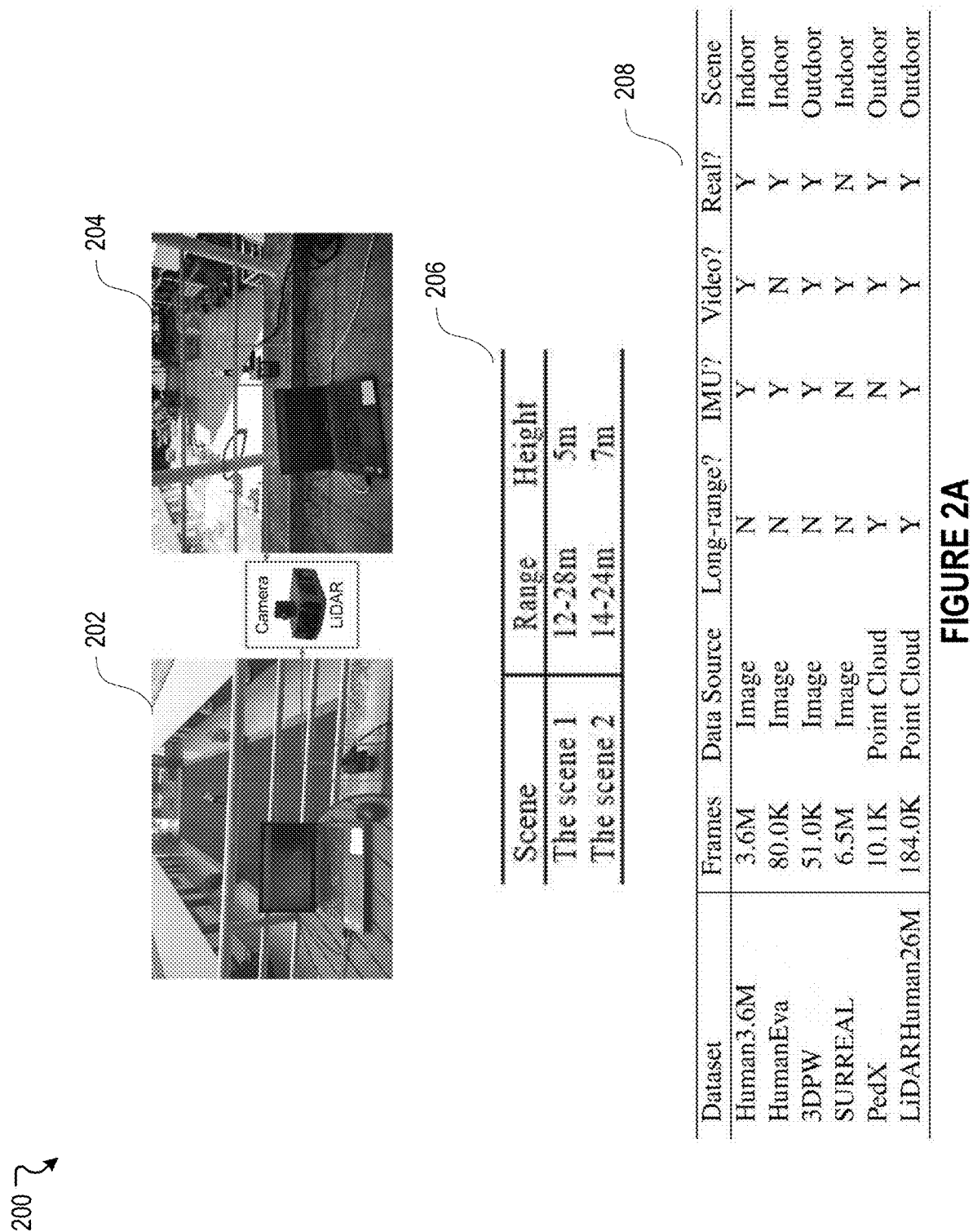
FIG. 2A illustrates a scenario in which a LiDARHuman26M dataset can be collected, according to various embodiments of the present disclosure.

In general, long-range motion capture has great potentials in various applications, such as immersive VR/AR experience and action quality assessment. In accordance with various embodiments of the present inventions, a first long-range LiDAR-based motion capture dataset, the LiDARHuman26M dataset, is provided herein in further detail. FIG. 2A illustrates a scenario 200 in which the LiDARHuman26M dataset can be collected, according to various embodiments of the present disclosure. As shown in FIG. 2A, the LiDARHuman26M dataset can be collected in two separate scenarios. For example, as shown in FIG. 2A, a first scene 202 depicts a patio, which supports long distance human capture. A second scene 204 is an open space between two buildings, which supports a large capturing pitch angle to avoid self-occlusion. Setup details of a collection equipment (i.e., the LiDAR sensor and the camera shown in FIG. 2A) are shown in table 206. In this example, objects (i.e., humans) in the first scene 202 are situated 12-28 meters from the collection equipment. Further, in this example, the collection equipment is situated at a height of 5 meters from the objects. Likewise, objects in the second scene 204 are situated 14-24 meters from the collection equipment and the collection equipment is situated at a height of 7 meters. For data collection in the first scenario 202 and the second scenario 204, 13 performers were recruited to participate in data collection of the LiDARHuman26M dataset, and duration for each scenario varied from 15 to 30 minutes. As results of this data collection, the LiDARHuman26M dataset can provide 184,048 frames of point cloud data with 26,414,383 data points, and includes animations of 20 different types of daily motions. For example, motions associated with walking, running, exercising, etc. The LiDARHuman26M dataset comprises three data modalities: synchronous LiDAR point clouds, color (RGB) images, and ground-truth 3D human motions from professional IMU-based mocap devices. The LiDARHuman26M dataset is preprocessed to eliminate backgrounds in frames of the point cloud data and localization errors associated with the IMU-based mocap devices. In some embodiments, after data collection and preprocessing, the LiDARHuman26M dataset can include synchronous images. The synchronous images can be annotated to include labels. Each label can comprise a two-dimensional area or an enclosure enclosing an object depicted in the synchronous images. In general, labels associated with objects and poses associated with the objects can have one-to-one correspondence. In some embodiments, each data point of the ground-truth three-dimensional motion data 102c can comprise or be associated with a timestamp, spatial coordinates and rotations associated with joints of performers as measured by IMU devices. In some embodiments, the LiDARHuman26M dataset can further include global coordinates of joints and rotations associated with the joints. In some embodiments, the synchronous images can be captured using a camera that is capable of capturing images at 30 frames per second and at 1920×1080 resolution. The camera must capture images in red, green, and blue color channels and timestamp each image. In some embodiments, the point clouds of the LiDARHuman26M dataset can be captured by a monocular LiDAR capable of capturing point cloud at 10 frames per second with approximately 70,000 points (e.g., laser dots) in each point cloud frame. Each point of the point cloud can be described by a Cartesian coordinate and an intensity value. Lastly, each frame of the point cloud can be timestamped.

Table 208 in FIG. 2A presents statistics of the LiDARHuman26M dataset in comparison to other publicly available three-dimensional human pose datasets. As shown in Table 208, the LiDARHuman26M dataset has the following features: First, the LiDARHuman26M dataset contains many long-range (up to 28 meters away) human motions, while image datasets (e.g., Human3.6M, HumanEva, etc.) in Table 208 usually have limited capturing distance. Second, the LiDARHuman26M dataset covers up to 20 daily motions, while other datasets in Table 208 have much limited motions. Third, the LiDARHuman26M dataset covers three different modalities, including point clouds, RGB videos, and mocap ground truth provided by IMU devices. Furthermore, image-based datasets in Table 208 do not provide depth information, which is essential for long-range motion capture.

LiDARCap

Figure 2B:
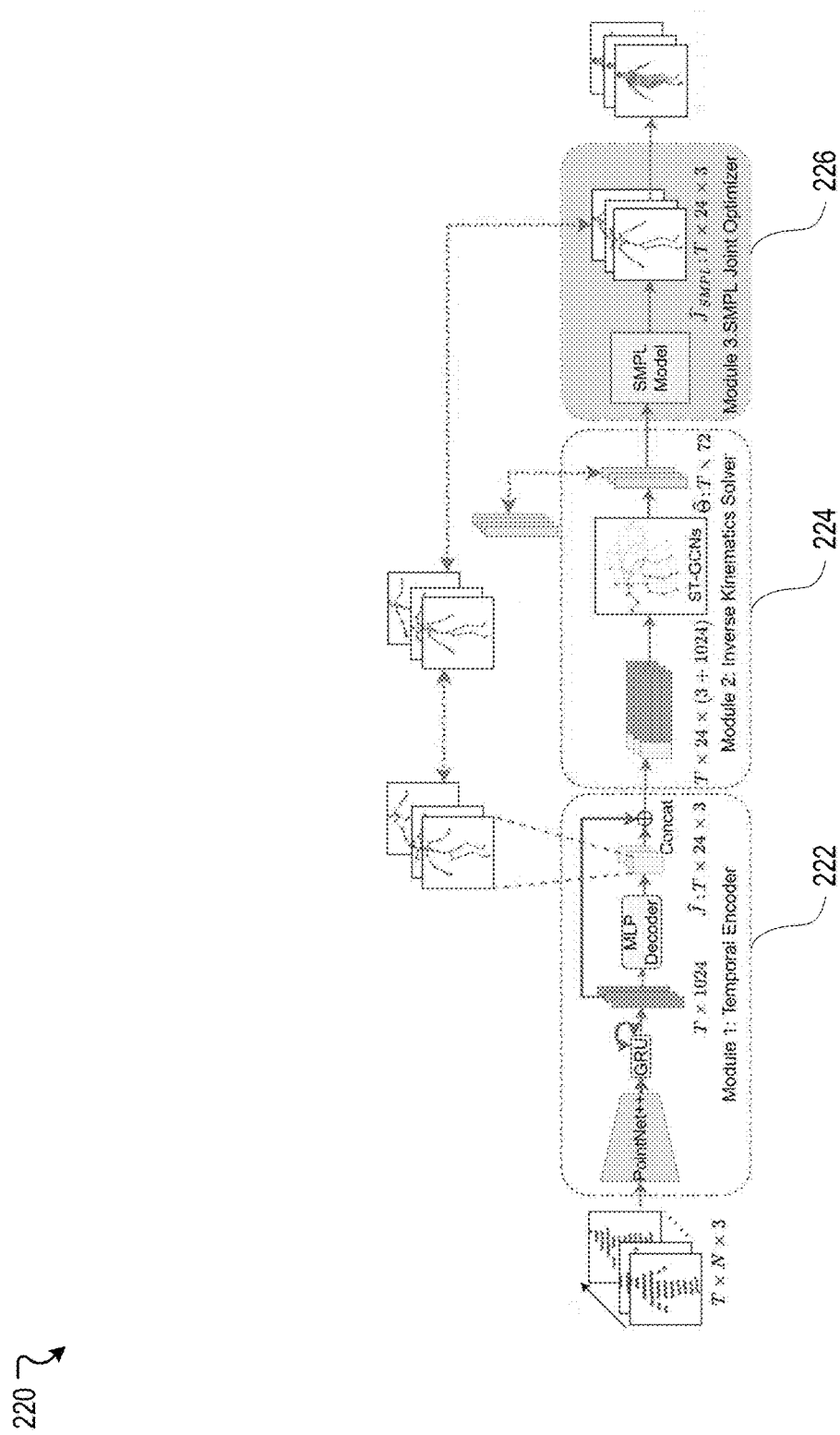
FIG. 2B illustrates a marker-less, long-range, and data-driven method for 3D human motion capture using LiDAR point clouds (LiDAR Cap), according to various embodiments of the present disclosure.

FIG. 2B illustrates a marker-less, long-range, and data-driven method for 3D human motion capture using LiDAR point clouds (LiDAR Cap), according to various embodiments of the present disclosure. In accordance with various embodiments of the present inventions, the LiDARCap shown in FIG. 2B can be trained on the LiDARHuman26M dataset. In such embodiments, the LiDARCap can take point cloud sequences from a monocular LiDAR sensor, as input, and output three-dimensional human motion sequences. In some embodiments, the LiDARCap can include a processing module (not shown in FIG. 2B), a temporal encoder module 222, an inverse kinematics solver module 224, and a SMPL joint optimizer module 226. Each of these modules will be discussed in further detail below.

In some embodiments, the preprocessing module can be configured to sample data points in a frame of point clouds into a particular data size. For example, given an input LiDAR point cloud sequence $\mathcal{P}\{P^{(t)}|t=1\ldots T\}$ of T frames and each frame contains arbitrary number of points $P^{(t)} = \{p_i^{(t)}|i=1\ldots n_t\}$. In this example, a number of points in each frame is fixed to 512, by the preprocessing module, by sampling or repeating a unified down-sampling operation. As another example, the preprocessing module can fix the number of points in each frame to 1024. Many variations are possible and contemplated.

Figure 2C:
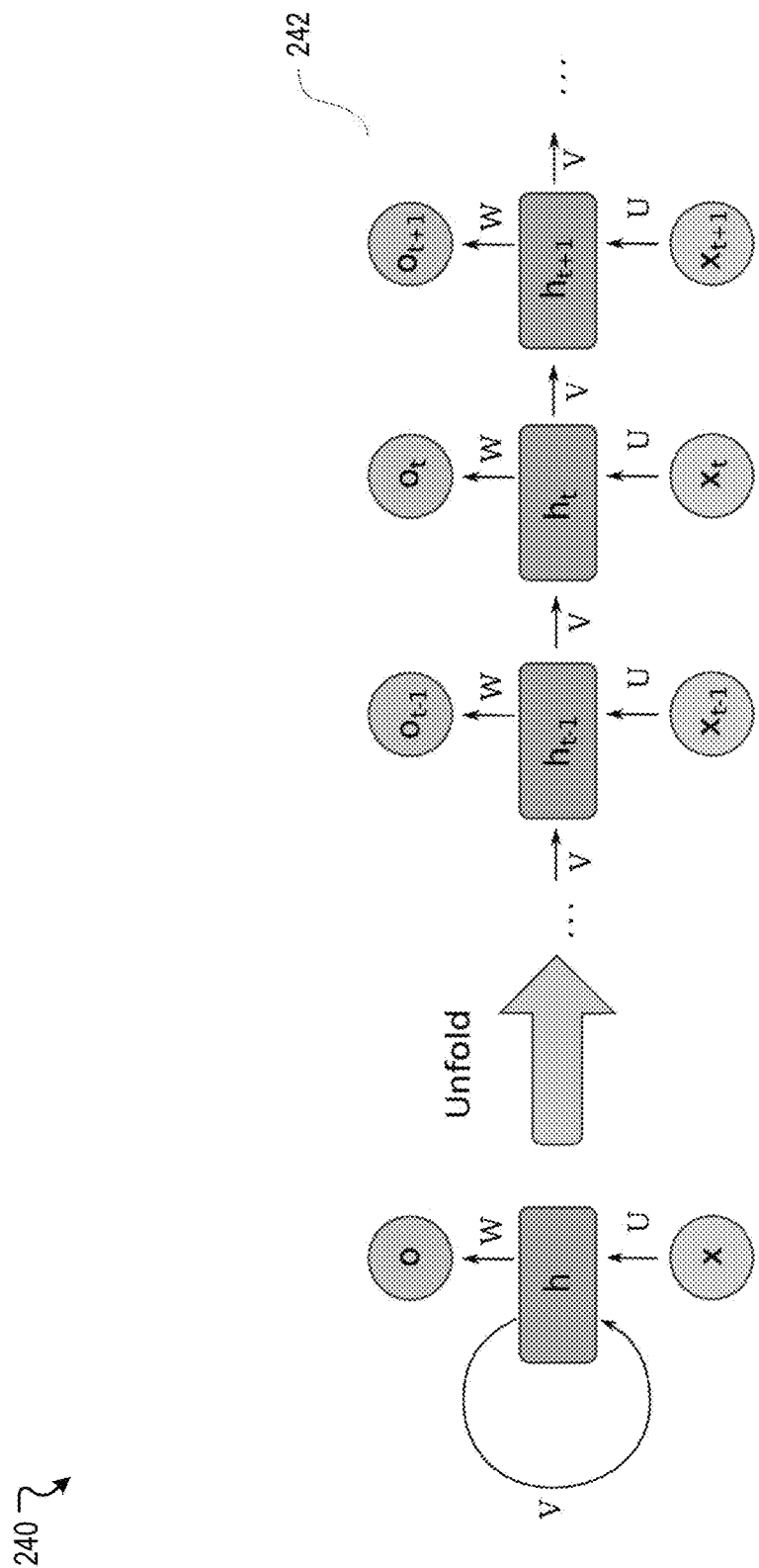
FIG. 2C illustrates a structure of hidden variables of a GRU, according to various embodiments of the present disclosure.

In some embodiments, the temporal encoder module 222 can be configured to extract a global descriptor for each point cloud frame. In some embodiments, the temporal encoder module 222 can be implemented using a PointNet++ network. The PointNet++ network can be used as a backbone to extract a global descriptor $f^{(t)}$ for each point cloud frame $P^{(t)}$. For example, the PointNet++ network can be used to extract a 1024-dim global descriptor. In some embodiments, the temporal encoder module 222 can further include a two-way Gated Recurring Unit (bi-GRU). The bi-GRU can be used fuse temporal information, frame-wise features $f^{(t)}$ into a global descriptor to generate hidden variables $g^{(t)}$. In general, the bi-GRU is a variation of Recurring Neural Network (RNN). In such a configuration, the RNN can stack a structure of the hidden variables, and can unfold the hidden variable over time as shown FIG. 2C. FIG. 2C illustrates a structure of hidden variables 240 of the bi-GRU, according to various embodiments of the present disclosure. In FIG. 2C, the bi-GRU can include at least a hidden layer 242, and an output of the hidden layers is the hidden variables. Each hidden variable is just a tensor shaped like 1×C.

In some embodiments, the temporal encoder module 222 can further include a multiplayer perceptron (MLP) decoder. The MLP decoder can receive $g^{(t)}$ as input to predict corresponding joint locations $\hat{J}^{(t)} \in \mathbb{R}^{24 \times 3}$. In some embodiments, a loss $\mathcal{L}_J$ of the temporal encoder module 222 can be formulated as:

$$\mathcal{L}_J = \sum_t \left\| J_{GT}^{(t)} - \hat{J}^{(t)} \right\|_2^2$$

where $J_{GT}^{(t)}$ is the ground truth joint locations of the t-th frame.

In some embodiments, the inverse kinematic solver module 224 can be configured to extract features from the predicted joints in a graphical way. In some embodiments, the inverse kinematic solver module 224 can be implemented using a spatial-temporal graph convolutional network (ST-GCN). For example, in one embodiment, the ST-GCN can be adopted as a backbone to extract features of the predicted joints in a graph way. In some embodiments, the ST-GCN can concatenated a frame-wise global feature with each joint to generate completed joint features $Q^{(t)} \in \mathbb{R}^{24 \times (3+1024)}$ as graph nodes. Output of the ST-GCN can be subsequently fed into a regressor (not shown in FIG. 2B) to compute joint rotations $R_{6D}^{(t)} \in \mathbb{R}^{K \times 6}$. This 6D rotation can be mapped to a final axis-angle format when a loss is computed. The 6D rotation representation is chosen here as intermediate results for better continuity. In some embodiments, loss of this module $\mathcal{L}_\Theta$ is formulated as:

$$\mathcal{L}_\theta = \sum_t \left\| \theta_{GT}^{(t)} - \hat{\theta}^{(t)} \right\|_2^2$$

where $\theta_{GT}^{(t)}$ is the ground truth pose parameters of the t-th frame.

In some embodiments, the SMPL joint optimizer module 226 can be configured as the last stage of the LiDARCap to further improve the regression on θ. In some embodiments, the SMPL joint optimizer module 226 can include a skinned multi-person linear (SMPL) model. The joint rotations can be fed into the SMPL model to obtain 24 joints on a SMPL mesh. $\mathcal{L}_2$ loss between the predicted joints and the ground truth can be used again in the SMPL joint optimizer module 226 to increase an accuracy of the regressed θ. The difference is that the joints in the first stage are regressed directly through an MLP-based decoder, whereas, here, the joints are sampled on parametric mesh vertices as determined by θ. In some embodiments, a loss of the SMPL joint optimizer module 226 $\mathcal{L}_{J_{SMPL}}$ can be formulated as:

$$\mathcal{L}_{J_{SMPL}} = \sum_t \left\| J_{GT}^{(t)} - \hat{J}_{SMPL}^{(t)} \right\|_2^2$$

where $J_{SMPL}^{(t)}$ is the joint locations sampled from the SMPL mesh parameterized by the pose parameter $\hat{\theta}^{(t)}$. In general, this step can provide stronger constraints on the regression of θ in a geometrically intuitive way. In this way, an ablation experiment can be conducted to demonstrate its desirability.

In various embodiments, the LiDARCap can be trained through optimizing the united loss function L formulated as below in an end-to-end way:

$$\mathcal{L} = \mathcal{L}_J + \mathcal{L}_\Theta + \mathcal{L}_{J_{SMPL}}$$

LiDARCap Training

In various embodiments, the LiDARCap can be trained for 200 epochs with Adam optimizer and a dropout ratio is set to 0.5 for GRU layers and ST-GCN. Batch normalization layer can then be applied to every convolutional layer except the final output layer before the MLP decoder. In one embodiment, the LiDARCap can be trained utilizing a processor such as a graphics processing unit (GPU) or a central processing unit (CPU). A batch size can be set to be 8, while a learning rate can be set to be $1 \times 10^{-4}$ with as decay rate of $1 \times 10^{-4}$. During an evaluation phase of the LiDARCap, this network architecture is trained using the most suitable learning rate until convergence is achieved. In some embodiments, the LiDARCap can be trained on the LiDARHuman26M dataset, and experiment details are provided FIGS. 3A-3D.

Experiments

Figure 3A:
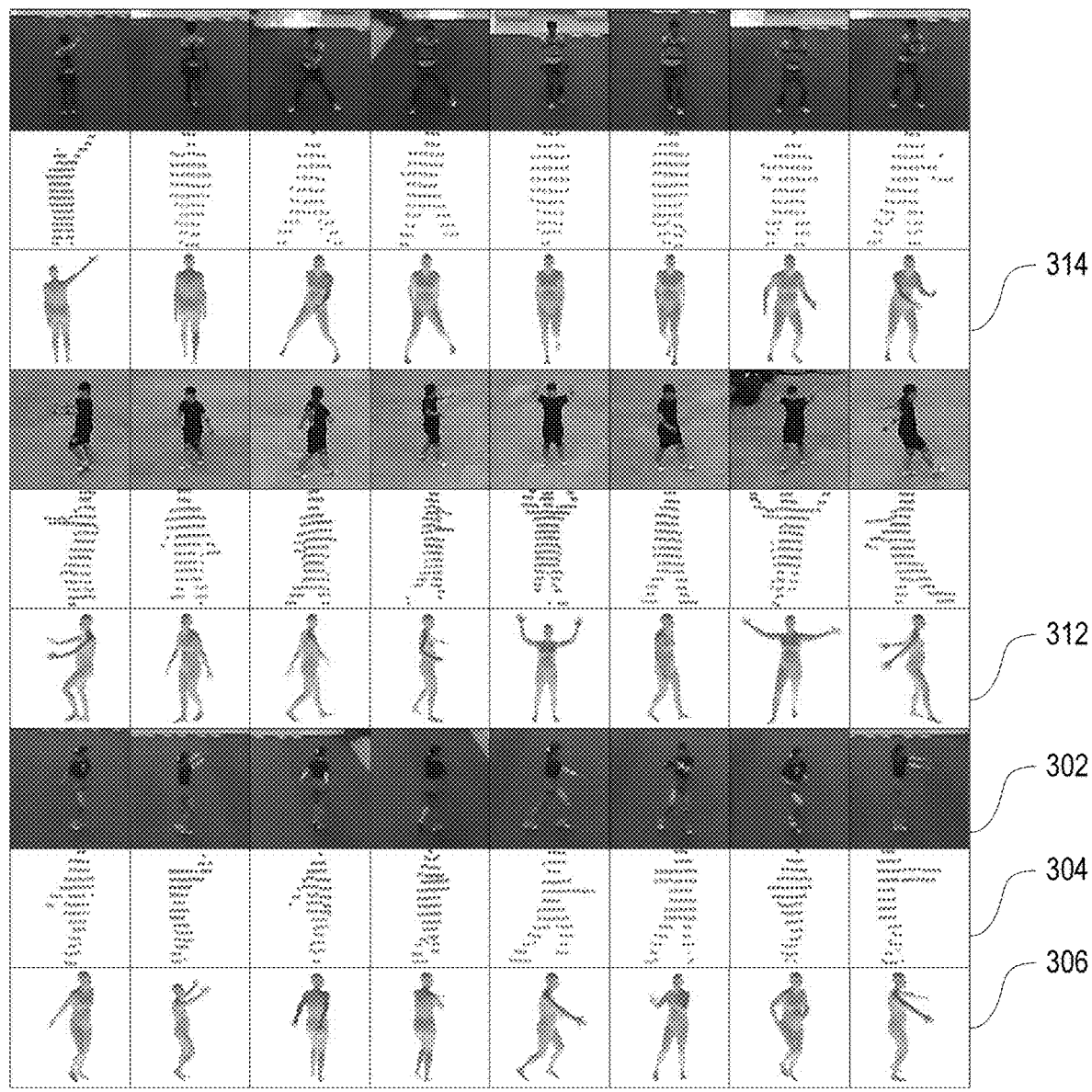
FIG. 3A illustrates results of long-range three-dimensional motions, according to various embodiments of the present disclosure.

In general, the proposed LiDARCap method described herein performs well in predicting human motion in long-range scenarios, as shown in FIG. 3A. FIG. 3A illustrates results of long-range three-dimensional motions, according to various embodiments of the present disclosure. FIG. 3A shows three graphic rows 302, 304, 306. The first graphic row 302 depicts image data of performers as captured by a camera. The second graphic row 304 depicts corresponding point cloud data of the performers as captured by a LiDAR sensor. The third graphic row 306 depicts corresponding three-dimensional human motions of the performers as generated by the LiDARCap. As shown in FIG. 3A, highly accurate three-dimensional human motions can be generated (or constructed) based solely on point cloud data captured from the LiDAR sensor. As further illustrated in FIG. 3A, the LiDARCap can accurately generate three-dimensional human motions when data points of a point cloud frame are sparse. For example, in FIG. 3A, a first three-dimensional human motion 312 is generated based on point cloud data having many data points. Whereas, in this example, a second three-dimensional human motion 314 is generated based on point cloud data having fewer data points. In this example, both the first three-dimensional human motion 312 and second three-dimensional human motion 314 accurately reflect depictions of human motions in corresponding image data. As such, the LiDARCap disclosed herein improves existing methods of capturing three-dimensional human motion under long-range situations.

Figure 3B:
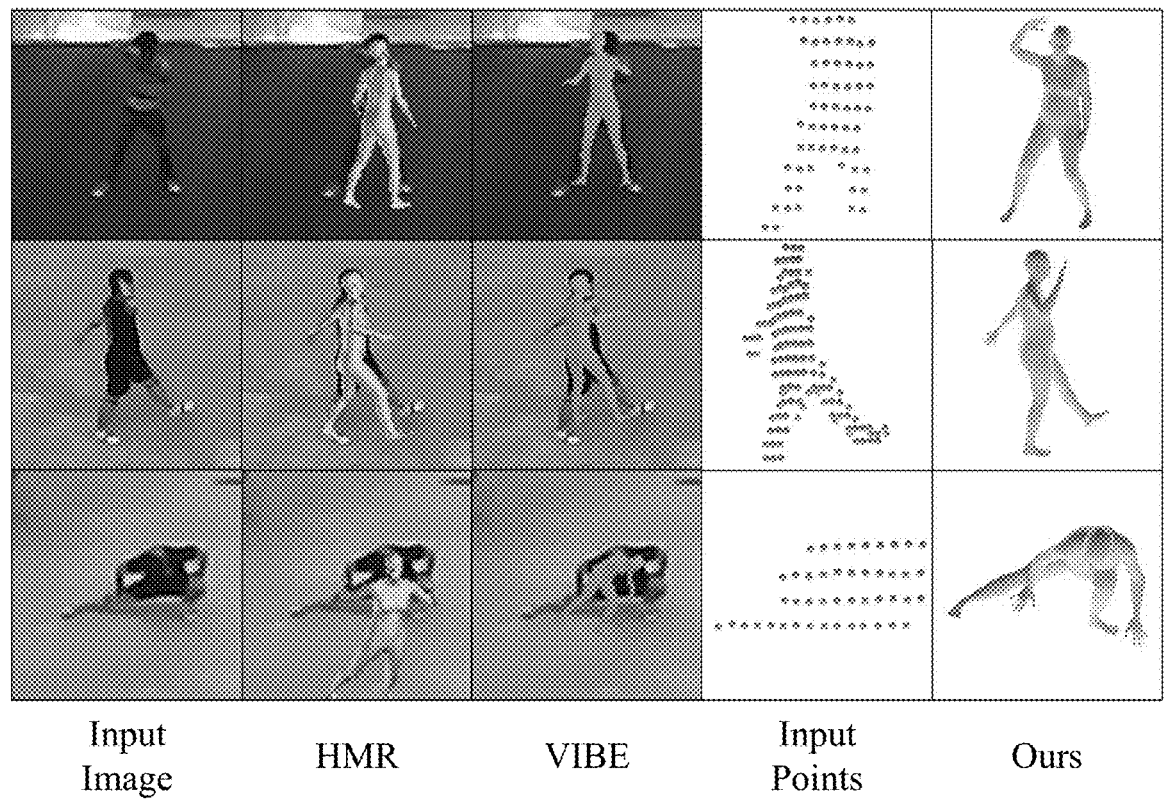
FIG. 3B illustrates a comparison between three-dimensional human motions generated using a LiDARCap with three-dimensional human motion generated using state-of-the-art image-based motion capture methods, according to various embodiments of the present disclosure.

For further investigation, the LiDARCap method was compared with the state-of-the-art (SOTA) image-based motion capture methods. FIG. 3B illustrates a comparison between three-dimensional human motions generated using the LiDARCap with three-dimensional human motion generated using the SOTA image-based motion capture methods, according to various embodiments of the present disclosure. Quantitative and qualitative comparisons with HMR and VIBE are conducted where the latter also relies on temporal encoding. As shown in FIG. 3B, benefited from the 3D distinguish-ability of the LiDAR point clouds, the LiDARCap method outperforms the SOTA image-based methods.

FIG. 3C illustrates table 342 comparing quantitative comparisons of three-dimensional human motions, according to various embodiments of the present disclosure. Table 342 shows corresponding quantitative comparisons of three-dimensional human motions using different evaluation metrics. Table 342 reports Procrustes Aligned Mean Per Joint Position Error (PA-MPJPE), Mean Per Joint Position Error (MPJPE), Percentage of Correct Keypoints (PCK), and Per Vertex Error (PVE). Error metrics are measured in millimeters. In addition, Acceleration error (m/s^2) is also recorded as an important evaluation indicator for sequence data. Benefiting from effective use of 3D spatial information, the LiDARCap method significantly out-performs HMR and VIBE.

Evaluation

To study effects of different components of the LiDARCap method, two ablation experiments were conducted. The first experiment validates effectiveness of a combination of PointNet++ and ST-GCN of the temporal encoder module. The second experiment verifies effectiveness of a combination of temporal encoder module and inverse kinematics module. Results of these two experiments are summarized in Table 344 of FIG. 3C. As another experiment, the Point-Net++ (P++) backbone was replaced with other diligently-designed network structures, such as P4Transformer (P4T), attention (ATT) module, and the voting (VOT) module. In order to fuse spatial-temporal in-formation, the P4Transformer is used instead of the original one as the backbone of the latter two. Whether it is necessary to leverage ST-GCN to exploit the joint features over the temporal dimension in-stead of bi-GRU is evaluated as well. Table 346 of FIG. 3C shows comparison results mentioned above, from which it can be concluded that for the LiDAR-Cap, the more complicated operation like attention and voting will result in a decrease in performance. Global features help achieve the best performance, and there is no significant difference between P++ and P4T. Moreover, introducing a kinematic tree can help localize adjacent joints better than the bi-GRU, which can only impact the frame-wise global features. The convolution on same joints over time step also ensures the continuity and consistency explicitly.

Figure 3D:
FIG. 3D illustrates qualitative results of three-dimensional human motions, according to various embodiments of the present disclosure.

In general, the LiDARCap method can generate good results in long-range motion capture because the LiDARCap method benefits from excellent characteristic of point clouds. To verify generalizations of the LiDARCap method, the LiDARCap method is tested on point cloud sequences of pedestrians from the KITTI Detection Dataset and the Waymo Open Dataset as shown in FIG. 3D. FIG. 3D illustrates qualitative results of three-dimensional human motions, according to various embodiments of the present disclosure. It can be seen, from FIG. 3D, that the LiDARCap method can learn correct footsteps and global orientation of pedestrians. For the clear part of upper limbs, the LiDAR-Cap method can make correct placements, while for ambiguous limbs, the LiDARCap makes reasonable guesses through prior information of time series.

FIG. 4A illustrates a computing component 400 that includes one or more hardware processors 402 and a machine-readable storage media 404 storing a set of machine-readable/machine-executable instructions that, when executed, cause the hardware processor(s) 402 to perform a method for training machine learning models to generate three-dimensional motions based on LiDAR point clouds, according to various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, a machine learning model representing an object in a scene can be encoded. In some embodiments, the object can be a human or performer. In some embodiments, the machine learning model can comprise a temporal encoder module for extracting a global descriptor from each point cloud frame, generating a plurality of hidden variables for the global descriptor, and predicting a plurality of joint locations. In some embodiments, the machine learning model can further comprise a kinematics solver module for concatenating the global feature with each joint to generate completed joint features and outputting the completed joint features to compute the plurality of joint rotations. In some embodiments, the machine learning model can further comprise a joint optimizer module for optimizing rotations of the plurality of joint rotations.

At block 408, the machine learning model can be trained using a dataset comprising synchronous LiDAR point clouds captured by monocular LiDAR sensors and ground-truth three-dimensional motions obtained from IMU devices. In some embodiments, the synchronous LiDAR point clouds can comprise a plurality of point cloud frames captured by the monocular LiDAR sensors situated at a particular distance away from the human, and each point of the plurality of point cloud frames can comprise a timestamp. In some embodiments, the particular distance can range from at least 10 to 50 meters from the human. In some embodiments, the ground-truth three-dimensional motions can be associated with the human and each ground-truth three-dimensional motion of the human can comprise a timestamp, spatial coordinates, rotations of a plurality of joints of the human, and three-dimensional poses of the human. In some embodiments, the dataset can further comprise synchronous images of the human. The synchronous images of the human can include labels and each label can comprise a two-dimensional area or enclosure containing the human.

At block 410, the machine learning model can be configured to generate a three-dimensional motion of the object based on an input of a plurality of point cloud frames captured by a monocular LiDAR sensor. In some embodiments, a second machine learning model can be trained using the synchronous images in the dataset. The trained second machine learning model can output a second three-dimensional motion. The three-dimensional motion can be evaluated based on the second three-dimensional motion.

FIG. 4B illustrates a computing component 450 that includes one or more hardware processors 452 and a machine-readable storage media 454 storing a set of machine-readable/machine-executable instructions that, when executed, cause the hardware processor(s) 452 to perform a method for generating three-dimensional motion based on LiDAR point clouds, according to various embodiments of the present disclosure. The computing component 450 may be, for example, the computing system 500 of FIG. 5. The hardware processors 452 may include, for example, the processor(s) 504 of FIG. 5 or any other processing unit described herein. The machine-readable storage media 454 may include the main memory 506, the read-only memory (ROM) 508, the storage 510 of FIG. 5, and/or any other suitable machine-readable storage media described herein.

At block 456, a plurality of point cloud frames can be inputted into a machine learning model. Each point cloud frame can comprise a plurality of points captured by a monocular LiDAR sensor. In some embodiments, the machine learning model can comprise a temporal encoder module comprising a feature learning network, a two-way GRU, and an MLP decoder. In some embodiments, the machine learning model can be trained using a dataset comprising synchronous LiDAR point clouds captured by monocular LiDAR sensors and ground-truth three-dimensional motions obtained from IMU devices. In some embodiments, the synchronous LiDAR point clouds can comprise a plurality of point cloud frames captured by the monocular LiDAR sensors situated at a particular distance away from the human, and each point of the plurality of point cloud frames comprises a timestamp and an intensity value. In some embodiments, the particular distance can range from at least 10 to 50 meters from the human.

At block 458, the feature learning network can extract a global descriptor for each point cloud frame. In some embodiments, the feature learning network can be a PointNet++ network. In some embodiments, the feature learning network can be a Point 4D Transformer.

At block 460, the global descriptor can be fed into the two-way GRU to generate a plurality of hidden variables. In some embodiments, the two-way GRU can comprise a hidden layer configured to output the hidden variables.

At block 462, the hidden variables can be inputted to the MLP decoder to predict locations and rotations of a plurality of joints of an object. In some embodiments, the object can be a human.

At block 464, the trained machine learning model can output a three-dimensional motion of the object based on the predicted locations and rotations of the plurality of joints.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
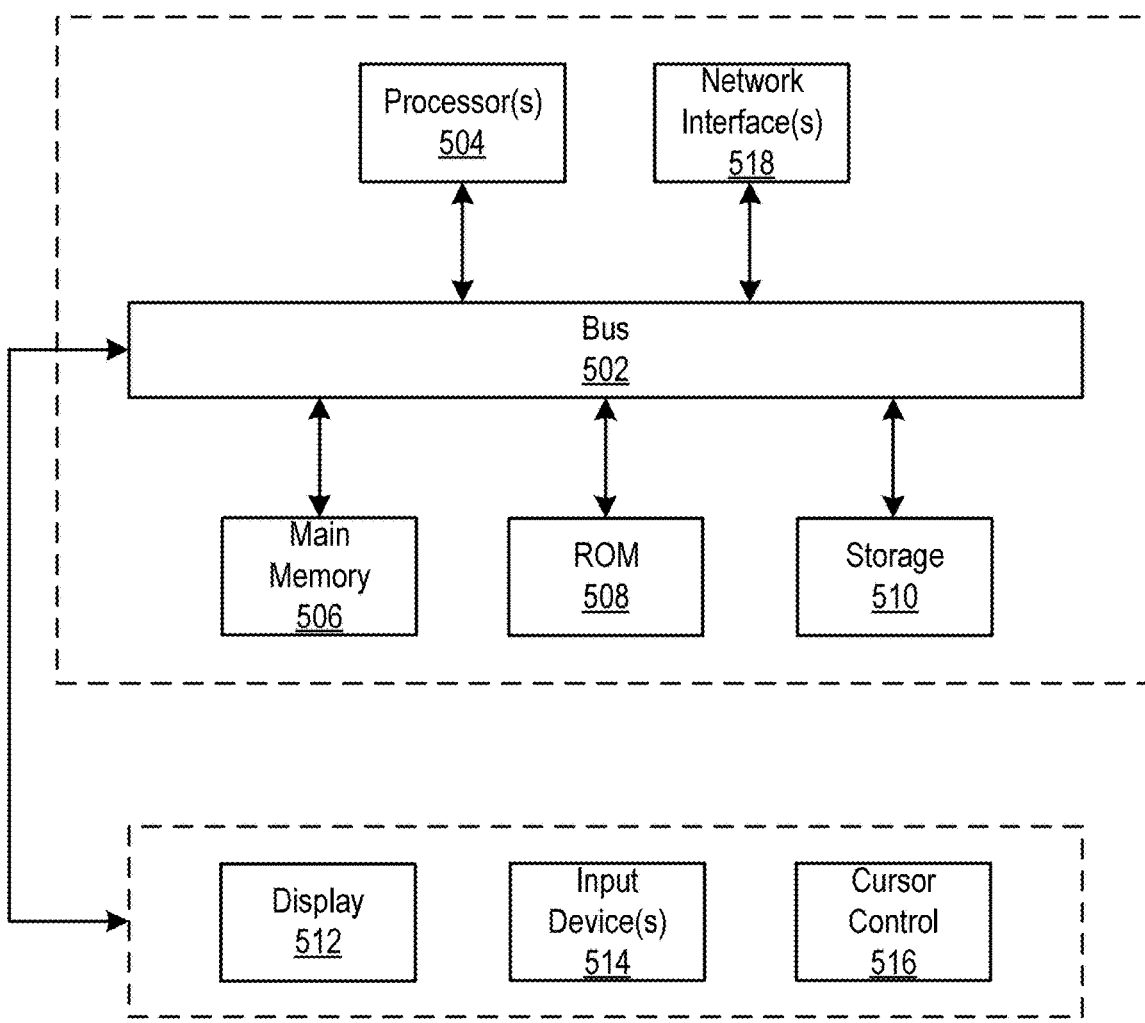
FIG. 5 illustrates a block diagram of a computer system upon which any of various embodiments described herein may be implemented.

FIG. 5 is a block diagram that illustrates a computer system 500 upon which any of various embodiments described herein may be implemented. The computer system 500 includes a bus 502 or other communication mechanism for communicating information, one or more hardware processors 504 coupled with bus 502 for processing information. A description that a device performs a task is intended to mean that one or more of the hardware processor(s) 504 performs.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as another component, and/or comprising same or similar features, characteristics, and parameters as another component.

What we claim is:

1. A computer-implemented method for training machine learning models to generate three-dimensional motions based on LiDAR point clouds, the method comprising:
   encoding, by a computing system, a machine learning model representing an object in a scene; and
   training, by the computing system, the machine learning model using a dataset comprising synchronous LiDAR point clouds captured by monocular LiDAR sensors and ground-truth three-dimensional motions obtained from Inertial Measurement Units (IMU) devices;
   wherein the machine learning model is configured to generate a three-dimensional motion of the object based on an input of a plurality of point cloud frames captured by a monocular LiDAR sensor, and
   the machine learning model comprises a feature learning network, a Gated Recurring Unit (GRU), a multiplayer perceptron (MLP) decoder, wherein the feature learning network is configured to extract a global descriptor from each point cloud frame, the GRU is configured to generate a plurality of hidden variables for the global descriptor, and the MLP decoder is configured to predict a plurality of joint locations based on the plurality of hidden variables.

2. The method of claim 1, wherein the object is a human.

3. The method of claim 2, wherein the synchronous LiDAR point clouds comprises a plurality of point cloud frames captured by the monocular LiDAR sensors situated at a particular distance away from the human, and each point of the plurality of point cloud frames comprises at least a timestamp, and wherein the distance ranges from at least 10 to 50 meters.

4. The method of claim 2, wherein the ground-truth three-dimensional motions are associated with the human and each ground-truth three-dimensional motion of the human comprises a timestamp, spatial coordinates, rotations of a plurality of joints of the human, and three-dimensional poses of the human.

5. The method of claim 2, wherein the dataset further comprises synchronous images of the human.

6. The method of claim 5, wherein the dataset further comprises labels for the synchronous images of the human, wherein each label comprises a two-dimension enclosure enclosing the human depicted in the synchronous images.

7. The method of claim 6, further comprising
training a second machine learning model using the synchronous images of the human in the dataset;
outputting, by the trained second machine learning model, a second three-dimensional motion of the human; and
evaluating the three-dimensional motion of the human based on the second three-dimensional motion of the human.

8. The method of claim 1, wherein the feature learning network comprises a PointNet++ network.

9. The method of claim 8, wherein the machine learning model further comprises a kinematics solver module for concatenating a frame-wise global feature with each joint to generate completed joint features and outputting the completed joint features to compute a plurality of joint rotations, wherein the kinematics solver comprises a ST-GCN configured to concatenate the frame-wise global features with each joint.

10. The method of claim 9, wherein the machine learning model further comprises a joint optimizer module for optimizing rotations of the plurality of joint rotations, wherein the joint optimizer module comprises a SMPL model configured to optimize the rotations of the plurality of joint rotations.

11. A system for training machine learning models to generate three-dimensional motions based on LiDAR point clouds, the system comprises comprising:
a processor;
a storage device for storing a machine learning model representing an object in a scene, and a dataset comprising synchronous LiDAR point clouds captured by monocular LiDAR sensors and ground-truth three-dimensional motions obtained from IMU devices, wherein the machine learning model is configured to generate a three-dimensional motion of the object based on an input of a plurality of point cloud frames captured by a monocular LiDAR sensor, and the machine learning model comprises a feature learning network, a Gated Recurring Unit (GRU), a multiplayer perceptron (MLP) decoder, wherein the feature learning network is configured to extract a global descriptor from each point cloud frame, the GRU is configured to generate a plurality of hidden variables for the global descriptor, and the MLP decoder is configured to predict a plurality of joint locations based on the plurality of hidden variables; and
a memory for storing instructions that, when executed by the processor, cause the system to perform training of the machine learning model using the dataset.

12. The system of claim 11, wherein the object is a human.

13. The system of claim 12, wherein the synchronous LiDAR point clouds comprises a plurality of point cloud frames captured by the monocular LiDAR sensors situated at a distance away from the human, and each point of the plurality of point cloud frames comprises a timestamp, and wherein the distance ranges from at least 10 to 50 meters.

14. The system of claim 12, wherein the ground-truth three-dimensional motions are associated with the human and each ground-truth three-dimensional motion of the human comprises a timestamp, spatial coordinates, rotations of a plurality of joints of the human, and three-dimensional poses of the human.

15. The system of claim 12, wherein the dataset further comprises synchronous images of the human.

16. The system of claim 15, wherein the dataset further comprises labels for the synchronous images of the human, wherein each label comprises a two-dimension enclosure enclosing the human depicted in the synchronous images.

17. The system of claim 16, wherein the instructions, when executed by the processor, further causes the system to perform:
training a second machine learning model using the synchronous images of the human in the dataset;
outputting, by the trained second machine learning model, a second three-dimensional motion of the human; and
evaluating the three-dimensional motion of the human based on the second three-dimensional motion of the human.

18. The system of claim 11, wherein the feature learning network comprises a PointNet++ network.

19. The system of claim 18, wherein the machine learning model further comprises a kinematics solver module for concatenating a frame-wise global feature with each joint to generate completed joint features and outputting the completed joint features to compute a plurality of joint rotations, wherein the kinematics solver comprises a ST-GCN configured to concatenate the frame-wise global features with each joint.

20. The system of claim 19, wherein the machine learning model further comprises a joint optimizer module for optimizing the plurality of joint rotations, wherein the joint optimizer module comprises a SMPL model configured to optimize the rotations of the plurality of joint rotations.

21. A computer-implemented method for generating three-dimensional motions based on LiDAR point clouds, the method comprising:
inputting a plurality of point cloud frames to a machine learning model, wherein each point cloud frame comprises a plurality of points captured by a monocular LiDAR sensor, and the machine learning model comprises a temporal encoder module comprising a feature learning network, a two-way GRU, and an MLP decoder;
extracting, by the feature learning network, a global descriptor for each point cloud frame;
feeding the global descriptor into the two-way GRU to generate a plurality of hidden variables;
inputting the hidden variables to the MLP decoder to predict locations and rotations of a plurality of joints of an object;
outputting, by the machine learning model, a three-dimensional motion of the object based on the predicted locations and rotations of the plurality of joints.

22. The method of claim 21, wherein the object is a human.

23. The method of claim 21, further comprising:
training the machine learning model using a dataset comprising synchronous LiDAR point clouds captured by monocular LiDAR sensors and ground-truth three-dimensional motions obtained from IMU devices.

24. The method of claim 23, wherein the synchronous LiDAR point clouds comprises a plurality of point cloud frames captured by the monocular LiDAR sensors situated at a distance away from a human, and each point of the plurality of point cloud frames comprises a timestamp and an intensity value, wherein the distance ranges from at least 10 to 50 meters.

25. The method of claim 21, wherein the feature learning network is a PointNet++ network.

26. The method of claim 21, wherein the feature learning network is a Point 4D Transformer.

27. The method of claim 21, wherein the two-way GRU comprises a hidden layer configured to output the hidden variables.

28. The method of claim 21, further comprising:
estimating the locations of the plurality of joints by the temporal encoder by minimizing a loss formulated as:

$$\mathcal{L}_J = \sum_k \left\| J_{GT}^{(t)} - \hat{J}^{(t)} \right\|_2^2 \quad (1)$$

where $\hat{J}^{(t)}$ is a predicted joint location of the t-th frame and $J_{GT}^{(t)}$ is a ground truth joint (t) location of the t-th frame.

29. The method of claim 21, wherein the machine learning model further comprises a kinematics solver module, wherein the kinematics solver module comprises a ST-CGN, and the method further comprises:
concatenating by the kinematics solver module the global descriptor with each joint to generate joint features; and
outputting the joint features to compute the rotations of the plurality of joints.

30. The method of claim 29, wherein the machine learning model further comprises a joint optimizer module, wherein the joint optimizer module comprises an SMPL model, and the method further comprises:
inputting the rotations of the plurality of joints to the joint optimizer module to obtain optimized rotations of the plurality of joints.

31. The method of claim 30, further comprising:
estimating the rotations of the plurality of joints by the temporal encoder module, the kinematics solver module, and the joint optimizer module.

* * * * *

UNITED STATES PATENT AND TRADEMARK OFFICE
CERTIFICATE OF CORRECTION

PATENT NO. : 12,270,910 B2  
APPLICATION NO. : 17/884273  
DATED : August 9, 2022  
INVENTOR(S) : Cheng Wang et al.

Page 1 of 1

It is certified that error appears in the above-identified patent and that said Letters Patent is hereby corrected as shown below:

In the Claims

In Claim 28, Column 17, Line 20, "$J_{GT}(^t)$ is a ground truth joint (t) location of the t-th frame." should read -- $J_{GT}(^t)$ is a ground truth joint location of the t-th frame. --

Signed and Sealed this  
Seventeenth Day of June, 2025

Coke Morgan Stewart  
*Acting Director of the United States Patent and Trademark Office*